(12) United States Patent
Guo et al.

(10) Patent No.: US 11,738,374 B2
(45) Date of Patent: Aug. 29, 2023

(54) LASER CLEANING EQUIPMENT AND CLEANING METHOD FOR SHAFT COMPONENT

(71) Applicant: Harbin Institute of Technology, Harbin (CN)

(72) Inventors: Bin Guo, Harbin (CN); Jie Xu, Harbin (CN); Donghe Zhang, Harbin (CN); Hui Wang, Harbin (CN); Debin Shan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 71 days.

(21) Appl. No.: 17/407,134

(22) Filed: Aug. 19, 2021

(65) Prior Publication Data
US 2022/0055078 A1    Feb. 24, 2022

(30) Foreign Application Priority Data

Aug. 20, 2020 (CN) .......................... 202010841024.5

(51) Int. Cl.
| | |
|---|---|
| *B08B 7/00* | (2006.01) |
| *B23K 26/08* | (2014.01) |
| *B23K 26/36* | (2014.01) |
| *B60S 3/00* | (2006.01) |

(52) U.S. Cl.
CPC ........ *B08B 7/0042* (2013.01); *B23K 26/0823* (2013.01); *B23K 26/0884* (2013.01); *B23K 26/36* (2013.01); *B60S 3/006* (2013.01); *B08B 2240/00* (2013.01)

(58) Field of Classification Search
CPC ............. B08B 7/0042; B08B 2240/00; B23K 26/0823; B23K 26/0884; B23K 26/36; B60S 3/006
See application file for complete search history.

(56) References Cited

U.S. PATENT DOCUMENTS

2014/0183174 A1*   7/2014   Yoon ........................ C21D 9/30
                                                                  219/121.78

FOREIGN PATENT DOCUMENTS

WO         WO9118705 A1 * 12/1991

\* cited by examiner

*Primary Examiner* — Sharidan Carrillo
(74) *Attorney, Agent, or Firm* — Patterson + Sheridan, LLP (57) ABSTRACT

Laser cleaning equipment and a cleaning method for a shaft component are provided. The equipment includes: a supporting base assembly; two driving wheel structures on the supporting base assembly, driving wheels of each of which is configured for being close to or away from each other, and the shaft component to be cleaned is placed between the two driving wheel structures; a friction wheel structure that is tangent to driving wheel structure(s) and uses a friction force thereof to drive driving wheel structure(s) to rotate; a connection shaft assembly that coaxially passes through the friction wheel structure; a power driving mechanism, one end of which that faces toward the connection shaft assembly is in drive connection with the connection shaft assembly and is configured to drive the connection shaft assembly to rotate; and a laser cleaning mechanism configured for performing laser cleaning on the shaft component to be cleaned.

3 Claims, 5 Drawing Sheets

LASER CLEANING EQUIPMENT AND CLEANING METHOD FOR SHAFT COMPONENT

CROSS REFERENCE TO RELATED APPLICATION

This patent application claims the benefit and priority of Chinese Patent Application 202010841024.5 filed on Aug. 20, 2020, the disclosure of which is incorporated by reference herein in its entirety as part of the present application.

TECHNICAL FIELD

The present disclosure relates to the field of axle cleaning equipment technologies, and specifically relates to laser cleaning equipment and a cleaning method for a shaft component.

BACKGROUND ART

After a power-driven vehicle has been in service for a certain period of time, its axles need to be cleaned and overhauled to ensure its normal operation. For example, the respective surfaces of train axles will be coated with paint layers serving as protective layers before being in service. However, after a certain distance in service, the surfaces of the train axles will be stained with dust or oil, or rust will be generated on the surfaces of the axles. Therefore, the paint, the rust, the oil, the dust and others on the surfaces of the axles must be removed before the axles are overhauled and renovated. Cleaning equipment that is mainly used in the current market includes a laser head, a driving wheel structure, and a driving motor. An axle to be cleaned is suitable for being placed on the driving wheel structure disposed oppositely; the driving motor drives the driving wheel structure to rotate to drive the axle to be cleaned to rotate; and the laser head is then used to clean the axle to be cleaned. However, since the train axles or other power axles have different diameters, the existing cleaning equipment cannot adapt to the driving operations of axles with different diameters, resulting in the narrow application range and the poor compatibility.

SUMMARY

The problems solved by the present disclosure are that the existing cleaning equipment cannot drive axles with different diameters to rotate, which is inconvenient for cleaning, and has the narrow application range and the poor compatibility.

In order to solve the above-mentioned problems, the present disclosure provides a laser cleaning equipment for a shaft component, including:

Therefore, the two driving wheel structures are disposed on the supporting base assembly, and driving wheels of each of the two driving wheel structures are configured for being close to or away from each other on the supporting base assembly, so that the equipment can support shaft components to be clean that have different diameters. The connection shaft assembly is coaxially passed through the friction wheel structure; the friction wheel structure is tangent to the driving wheel structure(s); and the power driving mechanism is in drive connection with an end of the connection shaft assembly that extends out of the friction wheel structure. Further, the power driving mechanism drives the friction wheel structure to rotate; and the friction force between the friction wheel structure and the driving wheel structures is configured to drive at least one driving wheel structure to rotate to drive the to-be-cleaned shaft component on the driving wheel structures to rotate. In this way, the laser cleaning equipment is convenient for performing movable laser cleaning operation on the rotating shaft component to be cleaned, so as to realize the laser cleaning operation on the shaft components with different diameters in the rotating process. So, the application range is wider, and the compatibility is good.

Optionally, the supporting base assembly includes master supporting frames which are spaced apart horizontally and slave supporting frames which are spaced apart horizontally, and a distance between one of the master supporting frames which is close to the power driving mechanism and one of the slave supporting frames which is away from the power driving mechanism is less than or equal to a length of the shaft component that is to be cleaned.

Optionally, the two driving wheel structures are respectively a first driving wheel and a second driving wheel; the first driving wheel includes a first master rotating shaft, a first slave rotating shaft, a first master driving wheel, and a first slave driving wheel; the second driving wheel includes a second master rotating shaft, a second slave rotating shaft, a second master driving wheel, and a second slave driving wheel; the first master driving wheel and the second master driving wheel are respectively arranged between the master supporting frames via the first master rotating shaft and the second master rotating shaft; and the first slave driving wheel and the second slave driving wheel are respectively arranged between the slave supporting frames via the first slave rotating shaft and the second slave rotating shaft.

Optionally, each of master supporting frames is provided with a first master hole group for adjusting position and a second master hole group for adjusting position which are oppositely disposed; the first master rotating shaft and the second master rotating shaft are respectively embedded in the first master hole group for adjusting position and the second master hole group for adjusting position; each of the slave supporting frames is provided with a first slave hole group for adjusting position and a second slave hole group for adjusting position which are oppositely disposed; the first slave rotating shaft and the second slave rotating shaft are respectively embedded in the first slave hole group for adjusting position and the second slave hole group for adjusting position.

Optionally, the friction wheel structure includes a master friction wheel and a slave friction wheel; and two ends of the connection shaft assembly are respectively connected with the master friction wheel and the slave friction wheel.

Optionally, the power driving mechanism includes a driving motor and a speed reducer; the driving motor is in drive connection with an input shaft of the speed reducer; and an output shaft of the speed reducer is in drive connection with the connection shaft assembly.

Optionally, the connection shaft assembly includes a middle connection shaft, a master shaft coupler, a slave shaft coupler, and a slave driving shaft; two ends of the middle connection shaft are respectively in transmitting connection with the master shaft coupler and the slave shaft coupler; the power driving mechanism includes a master driving shaft; an end of the master driving shaft that faces toward the middle connection shaft is in transmitting connection with an end of the master shaft coupler that is away from the middle connection shaft of the connection shaft assembly; and two ends of the slave driving shaft are respectively connected with the one of the slave supporting frames which is away from the power driving mechanism and an end of the slave shaft coupler that is away from the middle connection shaft.

Optionally, the laser cleaning equipment further includes a master supporter and a slave supporter, wherein the supporting base assembly further includes a master base and a slave base; two ends of the master supporter are respectively connected with the master base and an end of the connection shaft assembly that faces toward the master supporting frames; and two ends of the slave supporter are respectively connected with the slave base and an end of the connection shaft assembly that faces toward the slave supporting frames.

Optionally, the master supporter includes at least one first supporting structure; each of the at least one first supporting structure includes a first bearing base, a first screw and a first spring; the first bearing base is sleeved on the master driving shaft; two ends of the first screw are respectively connected with the first bearing base and the first spring; an end of the first spring that is away from the first screw is connected with the master base; and the slave supporter has a same structure as the master supporter.

Optionally, the master supporter includes a second supporting structure; the second supporting structure includes a torsion arm, a torsion link, and a link base; two ends of the torsion arm are rotatably connected with the power driving mechanism and the torsion link, respectively; an end of the torsion link that is away from the power driving mechanism is rotatably connected with the link base; and an end of the link base that is away from the power driving mechanism is connected with the master base.

Optionally, the laser cleaning equipment further includes a laser cleaning head; the laser cleaning head includes a laser cleaning head body, a dust collection outer shell, a dust collection inner shell, and a dust collection pipe; the dust collection outer shell is disposed at a lower end of the laser cleaning head body; the dust collection inner shell is arranged inside the dust collection outer shell; a dust collection channel is arranged between the dust collection inner shell and the dust collection outer shell; the dust collection pipe is arranged at an end of the dust collection outer shell that faces toward the laser cleaning head body; and the dust collection pipe is communicated with the dust collection channel.

Optionally, an aperture diameter, which is from an end of the dust collection outer shell that faces toward the laser cleaning head body to an end of the dust collection outer shell that is away from the laser cleaning head body, is gradually decreased.

The present disclosure further relates to a shaft component cleaning method carried out by the laser cleaning equipment for a shaft component in the above-mentioned embodiments, including: placing the shaft component that is to be cleaned between the two driving wheel structures; making the laser cleaning head of the laser cleaning equipment to be perpendicular to a first end surface of the shaft component that is to be cleaned; making the laser cleaning head emit laser to moveably clean the first end surface at a predetermined first moving speed, till the first end surface is completely cleaned; locating the laser cleaning head directly above a center line of the shaft component that is close to the first end surface, rotating the shaft component that is to be cleaned at an angular velocity, moving the laser cleaning head at a second moving speed along an X-axis direction, so as to moveably clean a side surface of the shaft component that is to be cleaned; rotating the laser cleaning head by 30 to 60 degrees to enable the laser cleaning head to be perpendicular to a surface of a transition region between sections of the shaft component that have different radiuses and to stop moving, and then making the laser cleaning head continuously emit the laser to perform laser cleaning on the transition region of the shaft component that rotates a circle at the angular velocity till the transition region is completely cleaned, when the laser cleaning head moves to the transition region; rotating the laser cleaning head again to a position directly above a cleaning region of a next section of the shaft component that is to be cleaned, performing the rotating the shaft component that is to be cleaned at the angular velocity, and performing the moving the laser cleaning head at the second moving speed along the X-axis direction, to clean the next section of the shaft component that is to be cleaned, till the side surface of the shaft component that is to be cleaned is completely cleaned; rotating the laser cleaning head to a second end surface of the shaft component that is to be cleaned, and making the laser cleaning head of the laser cleaning equipment to be perpendicular to the second end surface of the shaft component that is to be cleaned; and making the laser cleaning head emit the laser to moveably clean the second end surface at the predetermined first moving speed, till the second end surface is completely cleaned.

Optionally, a width of a linear laser spot emitted by the laser cleaning head is greater than or equal to diameters of both the first end surface and the second end surface.

Optionally, the second moving speed of the laser cleaning head is less than or equal to $Lw/2\pi$, where L represents the width of the linear laser spot; and w represents the angular velocity.

Reference signs in the drawings: 1: shaft component to be cleaned; 2: supporting base assembly; 21: master supporting frame; 211: first master hole group for adjusting position; 212: second master hole group for adjusting position; 22: master base; 23: slave supporting frame; 231: first slave hole group for adjusting position; 232: second slave hole group for adjusting position; 24: slave base; 3: driving wheel structure; 31: first master rotating shaft; 32: first slave rotating shaft; 33: first master driving wheel; 34: first slave driving wheel; 35: second master rotating shaft; 36: second slave rotating shaft; 37: second master driving wheel; 38: second slave driving wheel; 41: master friction wheel; 42: slave friction wheel; 5: connection shaft assembly; 51: middle connection shaft; 52: master shaft coupler; 53: slave shaft coupler; 54: slave driving shaft; 6: power driving mechanism; 61: driving motor; 62: speed reducer; 63: master driving shaft; 7: master supporter; 71: first supporting structure; 711: first bearing base; 712: first screw; 713: first spring; 72: second supporting structure; 721: torsion arm; 722: torsion link; 723: link base; 81: laser cleaning head; 811: laser cleaning head body; 812: dust collection outer shell; 813: dust collection inner shell; 814; dust collection pipe; 815: dust collection channel; 82: laser control cabinet; 83: moving assembly; 84: robotic arm; 9: workbench; 10: slave supporter.

DETAILED DESCRIPTION OF THE EMBODIMENTS

In order to make the foregoing objectives, features and advantages of the present disclosure more obvious and understandable, the specific embodiments of the present disclosure are described in detail with reference to the accompanying drawings.

It should be noted that in a coordinate system XYZ provided herein, the forward direction of the X-axis represents the right, and the opposite direction of the X-axis represents the left; the forward direction of the Y-axis represents the front, and the opposite direction of the Y-axis represents the rear; the forward direction of the Z-axis represents the upper side, and the opposite direction of the Z-axis represents the lower side. The terms "first", "second", etc. in the specification and the claims of the present disclosure and the above-mentioned drawings are used to distinguish similar objects, and are not necessarily used to describe a specific order or sequence. It should be understood that, data used in this way is interchangeable under appropriate circumstances so that the embodiments of the present disclosure described herein can be implemented in an order in addition to those illustrated or described herein.

In the description of the present disclosure, it should be noted that unless otherwise explicitly specified and defined, the terms "disposed", "mounted" "coupled" and "connected" shall be understood broadly, and may be, for example, fixedly connected, or detachably connected, or integrally connected, or mechanically connected, or directly connected, or indirectly connected through an intermediate medium, or interconnection between two elements. Those of ordinary skill in the art can understand the specific meanings of the above terms in the present disclosure according to specific situations.

In the description of the present specification, the description with reference to the terms "embodiments", "one embodiment", and "one implementation" and the like mean that the specific feature, structure, material or characteristic described in combination with the embodiment or the implementation is included in at least one embodiment or at least one implementation of the present disclosure. In the present specification, the schematic representations of the above terms do not necessarily refer to the same embodiment or implementation. Moreover, the described specific feature, structure, material or characteristic may be combined in any one or more embodiments or implementation in an appropriate manner.

Figure 1:
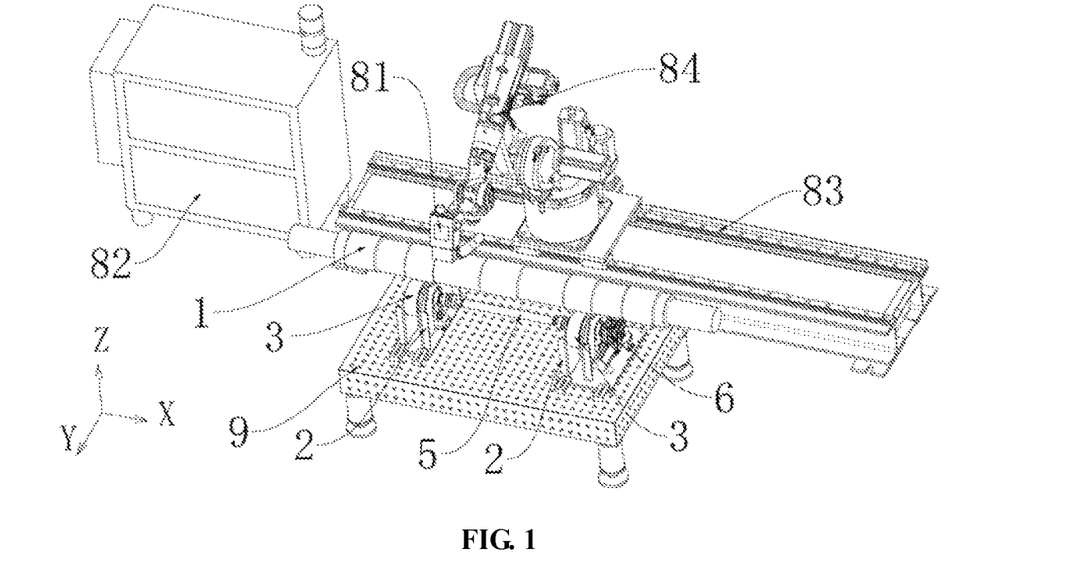
FIG. 1 is a schematic diagram showing an overall structure of laser cleaning equipment for a shaft component according to embodiments of the present disclosure.
Figure 2:
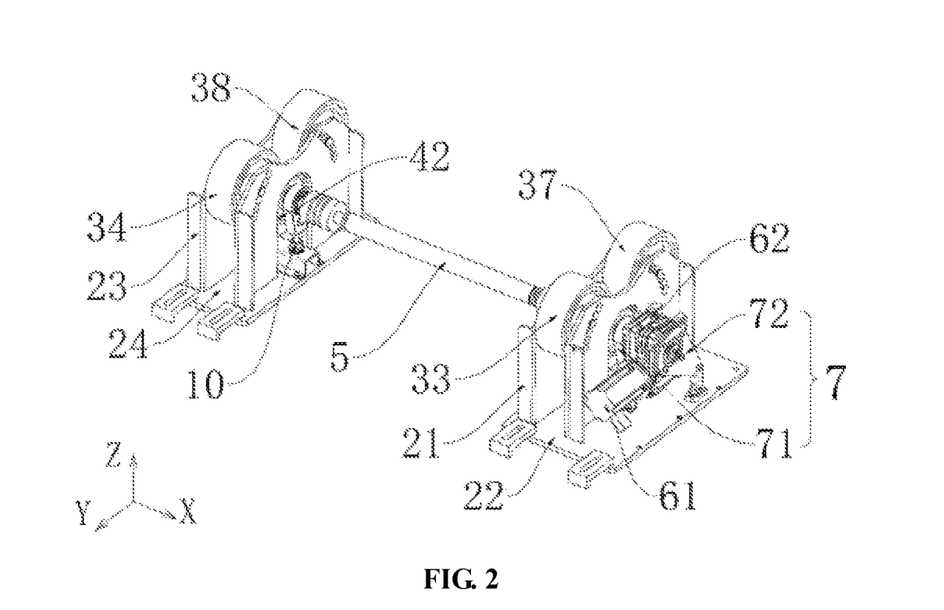
FIG. 2 is a first partially structural diagram of the cleaning equipment according to embodiments of the present disclosure.

In order to solve the above-mentioned problems, the present disclosure provides laser cleaning equipment for a shaft component, referring to FIG. 1 and FIG. 2. The laser cleaning equipment for the shaft component includes: a supporting base assembly 2; two driving wheel structures 3, where the two driving wheel structures 3 are disposed on the supporting base assembly 2, driving wheels (e.g., two driving wheels) of each of the two driving wheel structures 3 are configured for being close to or away from each other on the supporting base assembly 2, and the shaft component 1 to be cleaned is located between the two driving wheel structures 3; a friction wheel structure, where the friction wheel structure is tangent to at least one of the driving wheel structures 3 and drives the at least one driving wheel structure 3 to rotate via a frication force thereof; a connection shaft assembly 5, where the connection shaft assembly 5 is coaxially passed through the friction wheel structure; a power driving mechanism 6, where one end of the power driving mechanism 6 that faces toward the connection shaft assembly 5 is in drive connection with the connection shaft assembly 5, so as to drive the connection shaft assembly 5 to rotate; and a laser cleaning equipment, where the laser cleaning equipment is configured for performing moveable laser cleaning on the shaft component 1 to be cleaned.

It should be noted that a workbench 9 is further included. The supporting base assembly 2 is mounted on the workbench 9 through bolts. Mesh openings arranged in an array are formed in the workbench 9, so an installation position of the supporting base assembly 2 can be adjusted on the workbench 9. The laser cleaning equipment includes a laser control cabinet 82, a moving assembly 83, a robotic arm 84, and a laser cleaning head 81. Two ends of the robotic arm 84 are respectively connected with the moving assembly 83 and the laser cleaning head 81. The moving assembly 83 is configured to drive the robotic arm 84 to move horizontally. The moving assembly 83 includes a supporting rail, a servo motor, a ball screw element, and a moveable sliding plate. The servo motor is arranged on a side of a lower end of the supporting rail. An output shaft of the servo motor is in drive connection with one end of a screw rod body in the ball screw element, and the other end of the screw rod body in the ball screw element is arranged on a bottom surface through a bearing mounting base. Nuts of the ball screw element are sleeved on the screw rod body. A middle part of a lower end of the moveable sliding plate is connected with a nut seat. The front and rear sides of the moveable sliding plate are slidably connected with the supporting rail. The robotic arm 84 is disposed at an upper part of the moveable sliding plate. During working, the servo motor operates to drive the ball screw element to rotate, so that a rotation motion is converted into a linear motion through the ball screw element to drive the moveable sliding plate to drive the robotic arm 84 to move horizontally. A laser control device is arranged inside the laser control cabinet 82 and is electrically connected with the laser cleaning head 81, so as to drive the laser cleaning head 81 to be turned on or turned off. The robotic arm 84 is a robot that can drive the laser cleaning head 81 to rotate at various angles, which are omitted here.

In the present embodiment, the two driving wheel structures 3 are disposed on the supporting base assembly 2, and driving wheels of each of the two driving wheel structures 3 are configured for being close to or away from each other on the supporting base assembly 2, i.e., a distance between driving wheels of each of the two driving wheel structures 3 is adjustable. A shaft component 1, which is to be cleaned, of a relatively smaller diameter may be supported when the distance between the driving wheels of each of two driving wheel structures 3 decreases; and the shaft component 1, which is to be cleaned, of a relatively larger diameter may be supported when the distance between driving wheels of each of the two driving wheel structures 3 increases. So, the shaft components 1, which are to be cleaned, of different diameters may be supported. The connection shaft assembly 5 is coaxially passed through the friction wheel structure. The friction wheel structure is tangent to the driving wheel structure 3. The power driving mechanism 6 is in drive connection with the end of the connection shaft assembly 5 that extends out of the friction wheel structure. In this way, the power driving mechanism 6 drives the friction wheel structure to rotate; and the friction force between the friction wheel structure and the driving wheel structures 3 is used to drive at least one driving wheel structure 3 to rotate, so as to drive the shaft component 1 that is placed on the driving wheel structures 3 to rotate, so that the laser cleaning equipment is convenient for performing moveable laser cleaning on the shaft component 1 to be cleaned in the rotating process, which realizes the laser cleaning operation on the shaft components 1, that are to be cleaned, of different diameters in the rotating process. Accordingly, the application range is wide, and the compatibility is good.

Figure 3:
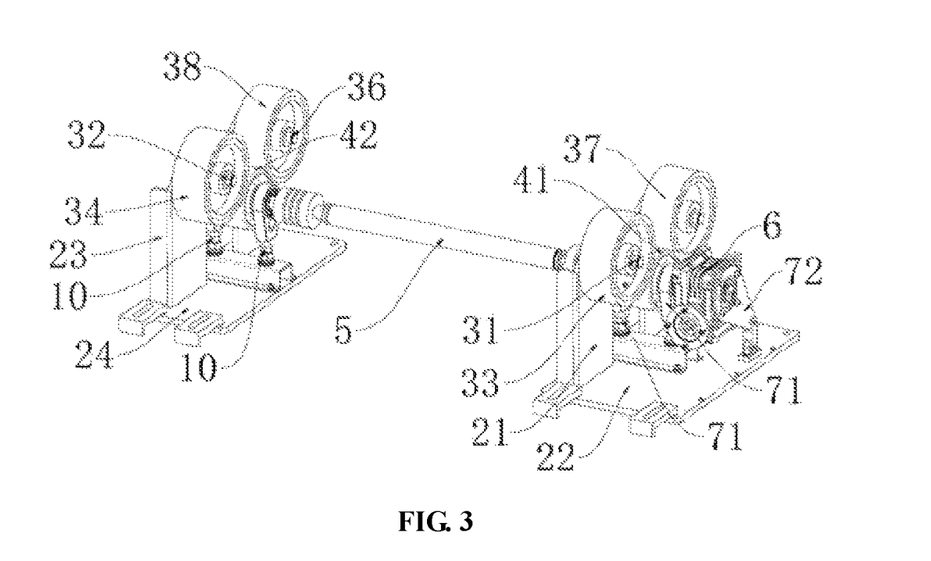
FIG. 3 is a second partially structural diagram of the cleaning equipment according to the embodiments of the present disclosure.

In one embodiment of the present disclosure, in combination with FIG. 2 and FIG. 3, the supporting base assembly 2 includes master supporting frames 21 which are spaced apart horizontally and slave supporting frames 23 which are spaced apart horizontally. A maximum distance between the master supporting frame 21 and the slave supporting frame 23 is less than or equal to the length of the shaft component 1 to be cleaned. The maximum distance is a distance between one of the master supporting frames which is close to the power driving mechanism and one of the slave supporting frames which is away from the power driving mechanism.

It should be noted that the supporting base assembly 2 includes the master supporting frames 21 and the slave supporting frames 23 which are arranged horizontally on the left and the right at intervals, respectively. The maximum distance between the master supporting frame 21 and the slave supporting frame 23 is less than or equal to the length of the shaft component 1 to be cleaned, so that the shaft component 1 to be cleaned is steadily placed and prevented from falling off.

Figure 6:
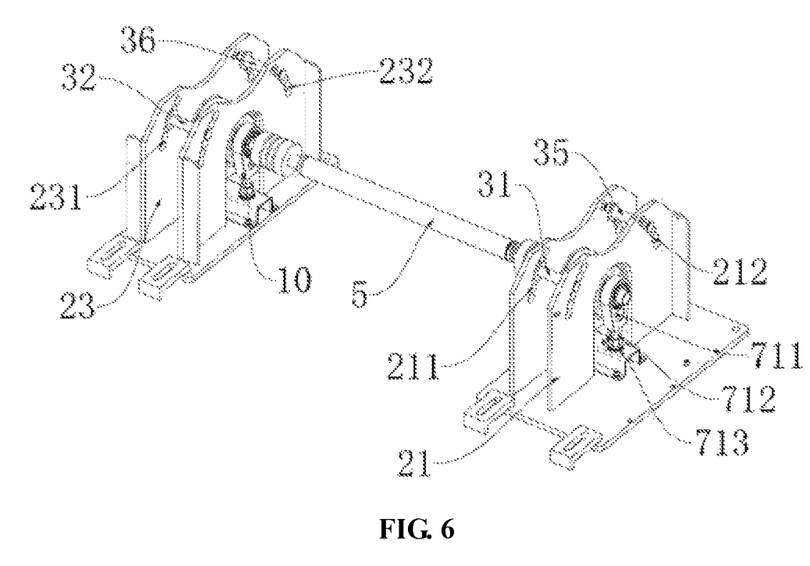
FIG. 6 is a third partially structural diagram of the cleaning equipment according to embodiments of the present disclosure.

In one embodiment of the present disclosure, referring to FIG. 2, FIG. 3, and FIG. 6, the two driving wheel structures 3 are respectively a first driving wheel and a second driving wheel. The first driving wheel includes a first master rotating shaft 31, a first slave rotating shaft 32, a first master driving wheel 33, and a first slave driving wheel 34. The second driving wheel includes a second master rotating shaft 35, a second slave rotating shaft 36, a second master driving wheel 37, and a second slave driving wheel 38. The first master driving wheel 33 and the second master driving wheel 37 are respectively arranged between the master supporting frames 21 by the first master rotating shaft 31 and the second master rotating shaft 35. The first slave driving wheel 34 and the second slave driving wheel 38 are respectively arranged between the slave supporting frames 23 by the first slave rotating shaft 32 and the second slave rotating shaft 36.

It should be noted that there are two master supporting frames 21 arranged at intervals to facilitate the supporting and placement of the first master driving wheel 33 and the second master driving wheel 37. That is, the first master supporting wheel and the second master supporting wheel are mounted between the two oppositely disposed master supporting frames 21 respectively through the first master rotating shaft 31 and the second master rotating shaft 35. There are two slave supporting frames 23 arranged at intervals to facilitate the supporting and placement of the first slave driving wheel 34 and the second slave driving wheel 38. That is, the first slave driving wheel 34 and the second slave driving wheel 38 are mounted between the two oppositely disposed slave supporting frames 23 respectively through the first slave rotating shaft 32 and the second slave rotating shaft 36. Moreover, the first main supporting wheel and the second main supporting wheel as well as the first slave driving wheel 34 and the second slave driving wheel 38 are horizontally disposed, so that the shaft component 1 to be cleaned can be steadily placed. The first master supporting wheel and the second master supporting wheel are disposed at an interval, and a distance between the first master supporting wheel and the second master supporting wheel can be adjusted on the main supporting base. The first slave driving wheel and the second slave driving wheel are disposed at an interval, and a distance between the first slave driving wheel and the second slave driving wheel can be adjusted on the slave supporting base.

In the present embodiment, in a case where one master driving wheel is tangent to a master friction wheel 41 and the other master driving wheel and the master friction wheel 41 are disposed at an interval(that is, the first master driving wheel 33 or the second master driving wheel 37 is tangent to the master friction wheel 41), and in a case where the two master driving wheels are tangent to the master friction wheel 41 (that is, the first master driving wheel 33 and the second master driving wheel 37 are both tangent to the master friction wheel 41), when the master friction wheel 41 rotates, the master driving wheels both can drive the shaft component 1 to be cleaned to rotate. Similarly, positional relationships between the slave driving wheels and a slave friction wheel 42 are the same as the positional relationships between the master driving wheels and the master friction wheel 41.

In one embodiment of the present disclosure, as shown in FIG. 6, the master supporting frame 21 is provided with a first master hole group for adjusting position 211 and a second master hole group for adjusting position 212 which are oppositely disposed. The first master rotating shaft 31 and the second master rotating shaft 35 are respectively embedded in the first master hole group for adjusting position 211 and the second master hole group for adjusting position 212; The slave supporting frame 23 is provided with a first slave hole group for adjusting position 231 and a second slave hole group for adjusting position 232 which are oppositely disposed. The first slave rotating shaft 32 and the second slave rotating shaft 36 are respectively embedded in the first slave hole group for adjusting position 231 and the second slave hole group for adjusting position 232.

It should be noted that the central axis of the connection shaft assembly 5 is parallel to the X-axis, which is a left-right direction. A direction perpendicular to the central axis of the connection shaft assembly 5 in a horizontal plane is a Y-axis direction, which is a front-rear direction. The first master hole group for adjusting position 211 and the second master hole group for adjusting position 212 are oppositely disposed on the master supporting frame 21 in the front-rear direction. The first master hole group for adjusting position 211 includes a plurality of first master holes for adjusting position arranged in a rectangular or arc shape, and the second master hole group for adjusting position 212 includes a plurality of second master holes for adjusting position arranged in a rectangular or arc shape. The first master rotating shaft 31 and the second master rotating shaft 35 are respectively embedded in the first master hole groups for adjusting position 211 and the second master hole groups for adjusting position 212. That is, the specific installation positions of the first master rotating shaft 31 in the plurality of first master holes for adjusting position and the specific installation positions of the second master rotating shaft 35 in the plurality of second master holes for adjusting position can be manually adjusted. Therefore, the distance between the first master driving wheel 33 and the second master driving wheel 37 can be adjusted. The first master hole group for adjusting position 211 and the first slave hole group for adjusting position 231, which are opposite to each other in the left-right direction, are respectively disposed at the front side parts of the master supporting frame 21 and the slave supporting frame 23. The second master hole group for adjusting position 212 and the second slave hole group for adjusting position 232, which are opposite in the left-right direction, are respectively disposed at the rear side parts of the master supporting frame 21 and the slave supporting frame 23. Similarly, the specific installation positions of the first slave rotating shaft 32 in the plurality of first slave holes for adjusting position and the specific installation positions of the second slave rotating shaft 36 in the plurality of second slave holes for adjusting position can be manually adjusted, so that an adjustable distance between the first slave driving wheel 34 and the second slave driving wheel 38 is realized. So, the shaft components 1, which are to be cleaned, of different diameters may be supported.

In one embodiment of the present disclosure, as shown in FIG. 3, the friction wheel structure includes the master friction wheel 41 and the slave friction wheel 42; and two ends of the connection shaft assembly 5 are respectively connected with the master friction wheel 41 and the slave friction wheel 42.

It should be noted that the master friction wheel 41 is arranged between the two master supporting frames 21, and the slave friction wheel 42 is arranged between the two slave supporting frames 23. Two ends of the connection shaft assembly 5 are respectively connected with the master friction wheel 41 and the slave friction wheel 42. The master friction wheel 41 and the slave friction wheel 42 are configured for rotating synchronously with the connection shaft assembly 5, that is, the master friction wheel 41 and the slave friction wheel 42 are supported and fixed by the connection shaft assembly 5. Therefore, when the power driving mechanism 6 works, the connection shaft assembly 5 is driven to rotate, to drive the master friction wheel 41 and the slave friction wheel 42 to rotate.

In the present embodiment, in order to ensure that the connection shaft assembly 5 supports the master friction wheel 41 and the slave friction wheel 42, master installation holes are respectively formed in portions of the master supporting frames 21 which are corresponding to the connection shaft assembly 5, and slave installation holes are respectively formed in portions of the master supporting frames 21 which are corresponding to the connection shaft assembly 5. That is, one end of the connection shaft assembly 5 that faces toward the master friction wheel 41 is arranged in the main installation holes in a penetrating manner, and the other end of the connection shaft assembly 5 that faces toward the slave friction wheel 42 is arranged in the slave installation holes in a penetrating manner.

In one embodiment of the present disclosure, as shown in FIG. 2, the power driving mechanism 6 includes a driving motor 61 and a speed reducer 62. The driving motor 61 is in drive connection with an input shaft of the speed reducer 62; and an output shaft of the speed reducer 62 is in drive connection with the connection shaft assembly 5.

It should be noted that the driving motor 61 is in drive connection with the input shaft of the speed reducer 62, and the output shaft of the speed reducer 62 is in drive connection with one end of the connection shaft assembly 5 that faces toward the speed reducer 62, so that the driving motor 61 works to drive, by means of the speed reducer 62, the connection shaft assembly 5 to rotate, and the rotation of the connection shaft assembly 5 drives the master friction wheel 41 and the slave friction wheel 42 to rotate synchronously.

Figure 4:
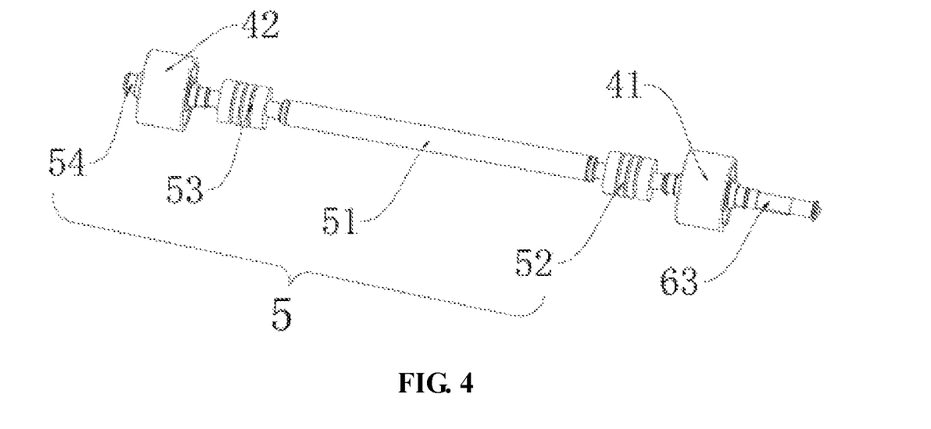
FIG. 4 is a schematic structural diagram of a connection shaft assembly according to embodiments of the present disclosure.

In one embodiment of the present disclosure, as shown in FIG. 4, the connection shaft assembly 5 includes a middle connection shaft 51, a master shaft coupler 52, a slave shaft coupler 53, and a slave driving shaft 54. Two ends of the middle connection shaft 51 are respectively in transmitting connection with the master shaft coupler 52 and the slave shaft coupler 53. The power driving mechanism 6 includes a master driving shaft 63. One end of the master driving shaft 63 that faces toward the middle connection shaft 51 is in transmitting connection with one end of the master shaft coupler 52 that is away from the middle connection shaft assembly 51 of the component 5. Two ends of the slave driving shaft 54 are respectively connected with one end of the slave shaft coupler 53 that is away from the middle connection shaft 51 and the slave supporting frame 23.

It should be noted that the master driving shaft 63 is an independent transmission shaft. That is, two ends of the master driving shaft 63 are respectively in transmitting connection with the output shaft of the speed reducer 62 and the master shaft coupler 52; or the master driving shaft 63 is the output shaft of the speed reducer 62. The central axis of the connection shaft assembly 5 is parallel to the X-axis direction. The master friction wheel 41 is sleeved on the master driving shaft 63, and the slave friction wheel 42 is sleeved on the slave driving shaft 54. The rotation principle of the connection shaft assembly 5 is as follows. The driving motor 61 works to drive the input shaft of the speed reducer 62 to rotate, and then the output shaft of the speed reducer 62 drives the master driving shaft 63 to rotate. The rotation of the master driving shaft 63 drives, by means of the master shaft coupler 52, the middle connection shaft 51 to rotate. The middle connection shaft 51 rotates by means of the slave shaft coupler 53 and the slave driving shaft 54. In this way, the synchronous rotation of the master friction wheel 41 and the slave friction wheel 42 are realized, thereby respectively driving the first master driving wheel 33, the second master driving wheel 37, the first slave driving wheel 34 and the second slave driving wheel 38 to rotate and finally realizing the rotation of the shaft component 1 to be cleaned.

Figure 9:
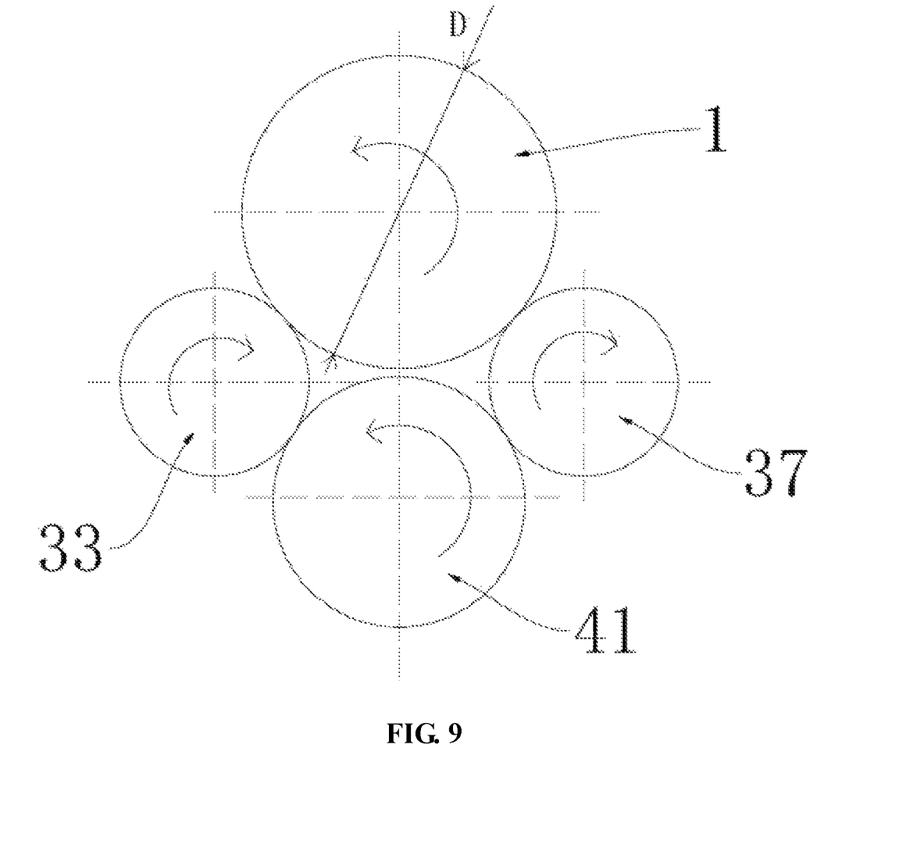
FIG. 9 is a schematic structural diagram of rotation directions of a driving wheel structure and a master friction wheel structure according to embodiments of the present disclosure.

In the present embodiment, FIG. 9 is a schematic structural diagram of rotation directions of the two master driving wheels and the master friction wheel 41. The first master driving wheel 33 and the second master driving wheel 37 are tangent to the master friction wheel 41, respectively. The connection shaft assembly 5 anticlockwise rotates to drive the master friction wheel 41 to anticlockwise rotate. Since the first master driving wheel 33 and the second master driving wheel 37 are tangent to the master friction wheel 41, respectively, the master friction wheel 41, at this time, makes use of a friction force thereof to simultaneously drive the first master driving wheel 33 and the second master driving wheel 37 to clockwise rotate. Since the shaft component 1 to be cleaned is suitable for being placed between the first master driving wheel 33 and the second master driving wheel 37, the shaft component 1 to be cleaned may be anticlockwise rotated. Similarly, when the connection shaft assembly 5 and the master friction wheel 41 clockwise rotate, the first master driving wheel 33 and the second master driving wheel 37 may anticlockwise rotate, and the shaft component 1 to be cleaned may clockwise rotate.

In one embodiment of the present disclosure, as shown in FIG. 2 and FIG. 3, the laser cleaning equipment for a shaft component further includes a master supporter 7 and a slave supporter 10. The supporting base assembly 2 further includes a master base 22 and a slave base 24. Two ends of the master supporter 7 are respectively connected with one end of the connection shaft assembly 5 that faces toward the master supporting frame 21 and the master base 22. Two ends of the slave supporter 10 are respectively connected with one end of the connection shaft assembly 5 that faces toward the slave supporting frame 23 and the slave base 24.

It should be noted that there are two master supporting frames 21 and two slave supporting frames 23, and there are one master base 22 and one slave base 24. The two master supporting frames 21 are arranged at an interval on the left and the right of the master base 22 and are perpendicularly disposed on the master base 22. The two slave supporting frames 23 are arranged at an interval on the left and the right of the slave base 24 and are perpendicularly disposed on the slave base 24. Two ends of the master supporter 7 are respectively connected with one end of connection shaft assembly 5 that faces toward the master supporting frames 21 and the master base 22. That is, the master supporter 7 is arranged between the master driving shaft 63 and the master base 22. Two ends of the slave supporter 10 are respectively connected with one end of the connection shaft assembly 5 that faces toward the slave supporting frames 23 and the slave base 24. That is, the slave supporter 10 is arranged between the slave driving shaft 54 and the master base 22. In this way, under the joint action of the master supporter 7 and the slave supporter 10, the speed reducer 62, the man driving shaft 63, the master friction wheel 41, the master shaft coupler 52, the middle connection shaft 51, the slave shaft coupler 53, the slave driving shaft 54, and the slave friction wheel 42 are always on the same horizontal straight line to ensure the installation and operation stability of the laser cleaning equipment for the shaft component.

Figure 5:
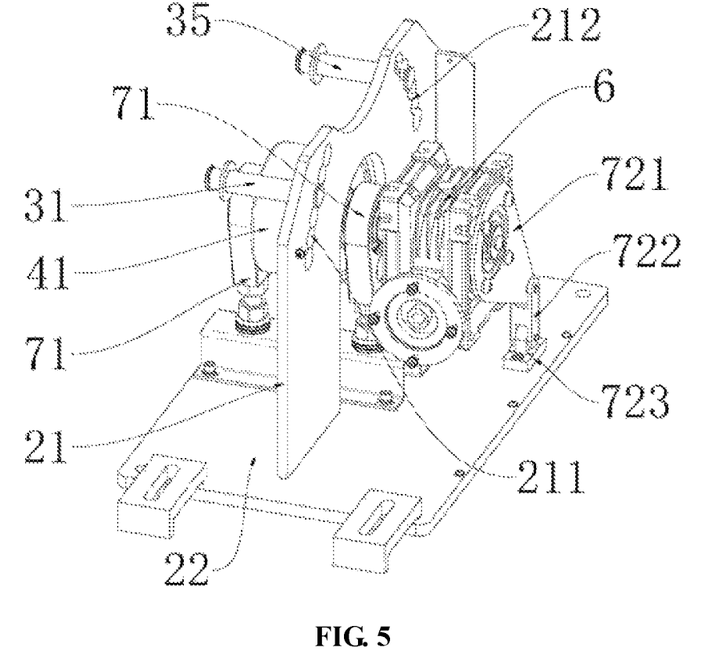
FIG. 5 is a schematic structural diagram of a master supporter according to embodiments of the present disclosure.

In one embodiment of the present disclosure, referring to FIG. 3, FIG. 5, and FIG. 6, the master supporter 7 includes at least one first supporting structure 71. The first supporting structure 71 includes a first bearing base 711, a first screw 712 and a first spring 713. The first bearing base 711 is sleeved on the master driving shaft 63. Two ends of the first screw 712 are connected with the first bearing base 711 and the first spring 713. One end of the first spring 713 which is away from the first screw 712 is connected with the master base 22. The slave supporter 10 has the same structure as the master supporter 7.

It should be noted that at least one first supporting structure 71 is provided. When there are two first supporting structures 71, they are respectively arranged between one end of the master driving shaft 63 that faces toward the master shaft coupler 52 and the master base 22, as well as between one end of the master driving shaft 63 that is away from the master shaft coupler 52 and the master base 22. The lower parts of the two master supporting frames 21 are both provided with arch openings to facilitate installation of the master friction wheel 41 and the first supporting structures 71. Similarly, the lower parts of the two slave supporting frames 23 are both provided with arch openings to facilitate installation of the slave friction wheel 42 and the slave supporter 10. The slave supporter 10 has the same structure as the master supporter 7. That is, the slave supporter 10 includes at least one third supporting structure, and the third supporting structure has the same structure as the first supporting structure 71. The at least one first supporting structure 71 in the master supporter 7 and the at least one third supporting structure in the slave supporter 10 are cooperated to not only support the whole connection shaft assembly 5, but to also stabilize the positions of the master shaft coupler 52 and the slave shaft coupler 53, respectively.

In the present embodiment, the first supporting structure 71 includes a first bearing base 711, a first screw 712, and a first spring 713. The first spring 713 is a belleville spring or a compression spring. The upper part of the first bearing base 711 is sleeved on the master driving shaft 63. The upper and lower ends of the first screw 712 are respectively detachably connected with the lower end of the first bearing base 711 and the upper end of the first spring 713. That is, the lower end of the first spring 713 can be connected with the base by means of threaded connection, hooking connection, snap-fit connection, etc. In order to ensure no horizontal offset misplacement of the first spring 713 during compression of the first spring 713, the supporting base assembly 2 further includes a master supporting base and a slave supporting base, and the master supporting base and the slave supporting base are both the channel steel. When the first spring 713 is the belleville spring, a positioning nut is sleeved outside the first screw 712; a portion of the first screw 712 that is located at the lower part of the positioning nut is embedded into the first spring 713; the upper end and the lower end of the first spring 713 respectively are abutted against the positioning nut and the master supporting base; and the lower end of the first screw 712 penetrates through the master supporting base. The lower end of the third supporting structure in the slave supporter 10 is connected with the slave supporting base. During working, the shaft component 1 to be cleaned is suitable for being placed on the two driving wheel structures 3, so that a stress part of the connection shaft assembly 5, i.e., the master shaft coupler 52 and the slave shaft coupler 53, may generate a slight up-down displacement, and the first supporting structure 71 of the master supporter 7 and the third supporting structure of the slave supporter 10 can have a slight up-down displacement along with the connection shaft assembly 5. So, the connection shaft assembly 5 is stabilized to prevent the connection shaft assembly 5 from being damaged due to long-time displacement deformation thereof, thereby affecting the cleaning effect of the laser cleaning equipment on the shaft component 1 to be cleaned. That is, the first supporting structure 71 in the master supporter 7 and the third supporting structure in the slave supporter 10 can not only play a role of supporting the connection shaft assembly 5, but also reduce the displacement deformation of the connection shaft assembly 5, so as to correspondingly prolong the service life of the connection shaft assembly 5 and ensure the cleaning quality of the shaft component 1 to be cleaned. The third supporting structure in the slave supporter 10 is the same as the first supporting structure 71, and details thereof are omitted here.

In one embodiment of the present disclosure, as shown in FIG. 5, the master supporter 7 includes a second supporting structure 72. The second supporting structure 72 includes a torsion arm 721, a torsion link 722, and a link base 723. Two ends of the torsion arm 721 are connected with the power driving mechanism 6 and the torsion link 722, respectively.

One end of the torsion link 722 that is away from the power driving mechanism 6 is rotatably connected with the link base 723. One end of the link base 723 that is away from the power driving mechanism 6 is connected with the master base 22.

It should be noted that the second supporting structure 72 is configured to stabilize the speed reducer 62 to reduce the pressed force on the master shaft coupler 52, which is caused by small amplitude vibration of the speed reducer 62 during working. One end of the torsion arm 721 that faces toward the speed reducer 62 is connected with the end part of the speed reducer 62 through a screw. One end of the torsion arm 721 that is away from the speed reducer 62 is rotatably connected with the upper end of the torsion link 722. The lower end of the torsion link 722 is rotatably connected with the upper end of the link base 723. The lower end of the link base 723 is fixedly mounted on the master base 22. When the shaft component 1 to be cleaned is placed on the two driving wheel structures 3, the first master driving wheel 33, the second master driving wheel 37, the first slave driving wheel 34, and the second slave driving wheel 38 all generate small-amplitude downward displacements under the action of the gravity. When the driving motor 61 works to drive the speed reducer 62 to drive the connection shaft assembly 5 to rotate, the speed reducer 62 may generate a small-amplitude displacement, and the torsion arm 721 and the torsion link 722 can stabilize the position of the speed reducer 62 after small-amplitude rotations thereof. That is, by means of the combined action of the first supporting structure 71 in the master supporter 7, the third supporting structure in the slave supporter 10, and the torsion arm 721 and the torsion link 722 in the second supporting structure 72, it is ensured that the speed reducer 62, the master friction wheel 41, the master shaft coupler 52, the middle connection shaft 51, the slave shaft coupler 53, the slave driving shaft 54, and the slave friction wheel 42 are always located on the same straight line.

Figure 7:
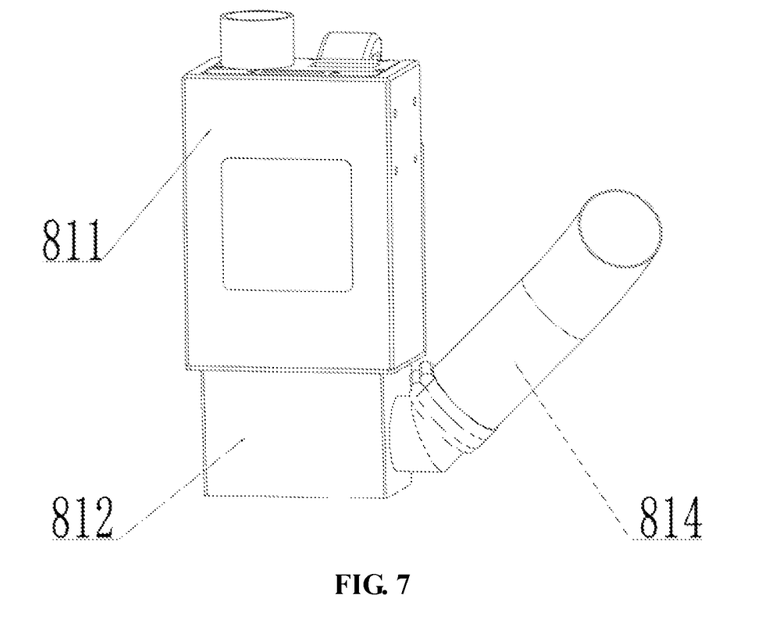
FIG. 7 is an externally structural diagram of a laser cleaning head according to embodiments of the present disclosure.
Figure 8:
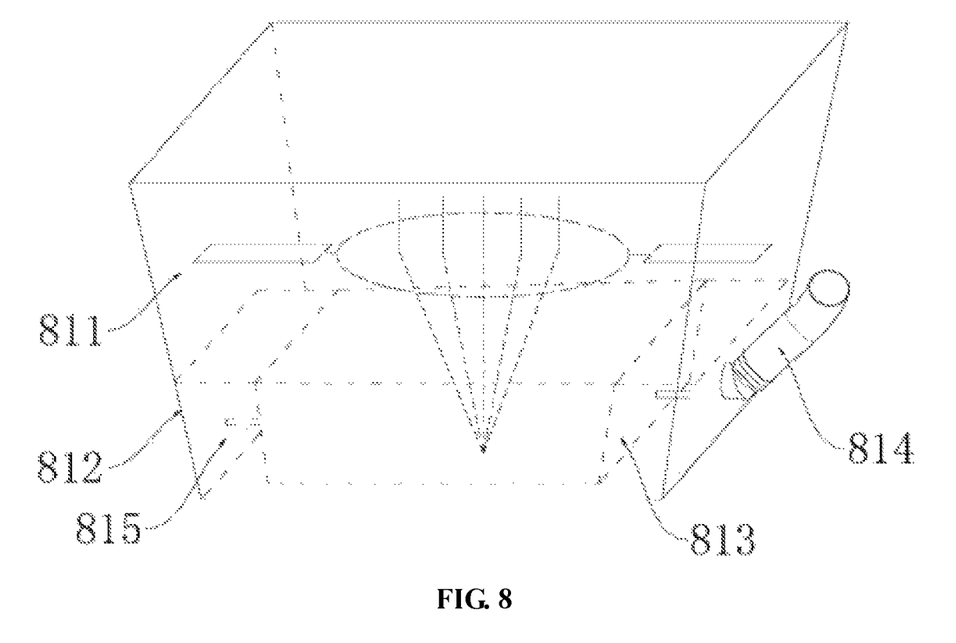
FIG. 8 is an internally structural diagram of the laser cleaning head according to embodiments of the present disclosure.

In one embodiment of the present disclosure, as shown in FIG. 7 and FIG. 8, the laser cleaning equipment includes a laser cleaning head 81. The laser cleaning head 81 includes a laser cleaning head body 811, a dust collection outer shell 812, a dust collection inner shell 813, and a dust collection pipe 814. The dust collection outer shell 812 is disposed at the lower end of the laser cleaning head body 811. The dust collection inner shell 813 is arranged inside the dust collection outer shell 812. A dust collection channel 815 is formed between the dust collection inner shell 813 and the dust collection outer shell 812. The dust collection pipe 814 is arranged at one end of the dust collection outer shell 812 that faces toward the laser cleaning head body 811; and the dust collection pipe 814 communicates with the dust collection channel 815.

It should be noted that a laser control cabinet is configured to control the laser cleaning head body 811 in the laser cleaning head 81 to be turned on or turned off, i.e., to emit laser or to stop emitting laser. The body of the laser cleaning head 81 can use a laser head in the existing technology and is used to emit the laser, which are omitted here. The dust collection outer shell 812 is connected with a housing of the body of the laser cleaning head 81 in a bolting connection manner or an adhesive connection manner. The dust collection inner shell 813 is detachably disposed inside the dust collection outer shell 812 by means of a link or other structures. The dust collection outer shell 812 and the dust collection inner shell 813 are both disposed upside down and are of internally hollowed square frustums. A laser beam emitted by the body of the laser cleaning head 81 passes through the inner center part of the dust collection inner shell 813. The dust collection channel 815 between the dust collection inner shell 813 and the dust collection outer shell 812 is a rectangular ring-channel. One end of the dust collection pip 814 that is away from the dust collection outer shell 812 is connected with an external dust collection fan. During cleaning of the shaft component 1 to be cleaned, the body of the laser cleaning head 81 generates laser to perform dust and dirt collection by the laser on the shaft component 1 to be cleaned. At this time, the surface of the shaft component 1 to be cleaned may generate a large amount of dust, and the external dust collection fan works to enable the dust collection pipe 814 to generate negative pressure, thereby sucking the large amount of dust and discharging the dust after passing through the dust collection channel 815 via the dust collection pipe 814, which avoids the large amount of dust from polluting the body of the laser cleaning head 81.

In one embodiment of the present disclosure, the aperture diameter, which is from one end of the dust collection outer shell 812 that faces toward the laser cleaning head body 811 to one end of the dust collection outer shell 812 that is away from the laser cleaning head body 811, is gradually decreased.

It should be noted that the aperture diameter, which is from one end of the dust collection outer shell 812 that faces toward the laser cleaning head body 811 to one end of the dust collection outer shell 812 that is away from the laser cleaning head body 811, is gradually decreased, so that the amount of the dust entering the laser cleaning head 81 in the laser cleaning process can be effectively reduced.

The present disclosure further provides a shaft component cleaning method carried out the laser cleaning equipment for a shaft component in the above-mentioned various embodiments, which includes the following steps.

In step S1, a shaft component 1 to be cleaned is properly placed between the two driving wheel structures 3. That is, the distance between driving wheels of each of the two driving wheel structures 3 is adjusted according to the diameter of the shaft component 1 to be cleaned so that the shaft component 1 to be cleaned can be stably placed on the two driving wheel structures 3.

In step S2, the laser cleaning head 81 in the laser cleaning equipment is made to be perpendicular to a first end surface of the shaft component 1 to be cleaned. That is, if the first end surface is the left end surface of the shaft component 1 to be cleaned, a second end surface is the right end surface of the shaft component 1 to be cleaned; or, if the first end surface is the right end surface of the shaft component 1 to be cleaned, the second end surface is the left end surface of the shaft component 1 to be cleaned. The laser emitted by the laser cleaning head 81 is used to clean the first end surface, and a width direction of spots of the laser is parallel to the central axis of the shaft component 1 to be cleaned.

In step S3, the laser cleaning head 81 emits laser to perform moveable cleaning on the first end surface at a predetermined first moving speed till the first end surface is completely cleaned. A distance between the laser cleaning head 81 and the first end surface is set to be a working distance of the laser cleaning head 81. A laser-output energy density is set to be greater than a cleaning threshold of dirt and less than a damage threshold of a base material, and the laser cleaning head 81 emits laser. The laser cleaning head 81 is controlled to clean the end surface of the shaft component 1 to be cleaned from bottom to top at a moving speed of 5 to 30 mm/s till the dirt on the first end surface is completely cleared away.

In step S4, the laser cleaning head 81 is located directly above the center line of the shaft component 1 that is close to the first end surface, the shaft component 1 to be cleaned is rotated at an angular velocity w, and the laser cleaning head 81 moves at a second moving speed V along an X-axis direction to perform moveable cleaning on the side surface of the shaft component 1 to be cleaned. The laser cleaning head 81 is perpendicular to the central axis of the shaft component 1 to be cleaned. When the laser cleaning head 81 is located at the position directly above the center line of the shaft component 1 that is close to the first end surface, the two driving wheel structures 3 rotate to drive the shaft component 1 to be cleaned to rotate at the angular speed w. Moreover, the laser-output energy density is set to be greater than the cleaning threshold of the dirt and less than the damage threshold of the base material; after the shaft component 1 to be cleaned rotates a circle, the laser cleaning head 81 moves to the right at a constant second moving speed V along the X-axis of the coordinate system in FIG. 1; and the second moving speed V is set to be less than or equal to Lw/2 π, so as to ensure that the shaft component 1 to be cleaned can be completely cleaned.

In step S5, when the laser cleaning head 81 moves to a transition region between sections of the shaft component 1 which have different radiuses, the laser cleaning head 81 rotates 30 to 60 degrees to be perpendicular to the surface of the transition region and to stop moving, and the laser cleaning head 81 then continuously emits laser to perform laser cleaning on the transition region of the shaft component 1 that rotates a circle at the angular speed w till the transition region is completely cleaned. The shaft component 1 to be cleaned has a plurality of segments with different diameters and transition regions, so that when the laser cleaning head 81 moves to the transition region between sections of the shaft component 1 which have different radiuses, the laser cleaning head 81 rotates 30 to 60 degrees to be perpendicular to the transition region, so as to facilitate cleaning of the transition region.

In step S6, the laser cleaning head 81 rotates again to a position directly above a cleaning region of a next section of the shaft component 1 to be cleaned, and the step S4 is performed to clean the next section of the shaft component 1 to be cleaned till the side surface of the shaft component 1 to be cleaned is completely cleaned. The laser cleaning head 81 rotates again to the position directly above the cleaning region of the next section of the shaft component 1 to be cleaned, and the step S4 is performed. That is, the laser cleaning head 81 moves at the second moving speed V along the X-axis direction to perform movable cleaning on the next section of the shaft component 1 to be cleaned.

In step S7, the laser cleaning head 81 rotates to a second end surface of the shaft component 1 to be cleaned, and the steps S2 and S3 are performed in sequence. After the whole side surface of the shaft component 1 to be cleaned is completely cleaned, the laser cleaning head 81 rotates to be perpendicular to the second end surface, and the steps S2 and S3 are performed in sequence to clean the right side end surface of the shaft component 1 to be cleaned from top to bottom. After cleaning, the laser cleaning head 81 returns to a start position in the step S2.

In the present embodiment, the laser cleaning head 81 firstly performs laser cleaning on the first end surface, i.e., the left end surface, of the shaft component 1 to be cleaned; then horizontally moves rightwards along the X-axis to perform moveable cleaning on the side surface of the shaft component 1 to be cleaned; and finally performs laser cleaning on the second end surface, i.e., the right end surface, of the shaft component 1 to be cleaned. Or, the laser cleaning head 81 firstly performs laser cleaning on the second end surface, i.e., the right end surface, of the shaft component 1 to be cleaned; then horizontally moves leftwards along the X-axis to perform moveable cleaning on the side surface of the shaft component 1 to be cleaned, and finally performs laser cleaning on the first end surface, i.e., the left end surface, of the shaft component 1 to be cleaned.

In one embodiment of the present disclosure, in the step S3 and the step S7, a width L of a linear laser spot emitted by the laser cleaning head 81 is set to be greater than or equal to diameters D of the first end surface and the second end surface.

It should be noted that the width L of the linear laser spot emitted by the laser cleaning head 81 is set to be greater than or equal to the diameters D of the end surfaces of the shaft component 1 to be cleaned, so as to ensure that the spot can completely cover the whole first end surface in the motion process of the laser cleaning head 81.

In one embodiment of the present disclosure, in the step S4, the second moving speed V of the laser cleaning head 81 is set to be less than or equal to Lw/2π.

It should be noted that by means of setting the second moving speed of the laser cleaning head 81, the movement speed V of the laser cleaning head is less than or equal to Lw/2π to ensure that the shaft component 1 to be cleaned can be completely cleaned.

Although the present disclosure is disclosed as above, the protection scope of the present disclosure is not limited to this. Those skilled in the art can make various changes and modifications without departing from the spirit and scope of the present disclosure, and these changes and modifications shall all fall within the protection scope of the present disclosure.

What is claimed is:

1. A shaft component cleaning method, the shaft component cleaning method being carried out by laser cleaning equipment for a shaft component, the laser cleaning equipment comprising:
a supporting base assembly;
two driving wheel structures supported by the supporting base assembly, wherein the two driving wheel structures are disposed on the supporting base assembly, wherein driving wheels of each of the two driving wheel structures are configured for being close to or away from each other on the supporting base assembly, and the shaft component is to be cleaned and is located between the two driving wheel structures;
a friction wheel structure, wherein the friction wheel structure is tangent to at least one of the two driving wheel structures and drives the at least one of the two driving wheel structures to rotate via a friction force thereof;
a connection shaft assembly, wherein the connection shaft assembly is coaxially passed through the friction wheel structure;
a power driving mechanism, wherein an end of the power driving mechanism that faces toward the connection shaft assembly is in drive connection with the connection shaft assembly, so as to drive the connection shaft assembly to rotate; and
a laser cleaning head, wherein the laser cleaning head is configured for performing moveable laser cleaning on the shaft component that is to be cleaned; wherein the shaft component cleaning method comprises:
placing the shaft component that is to be cleaned between the two driving wheel structures;

moving the laser cleaning head of the laser cleaning equipment to be perpendicular to a first end surface of the shaft component that is to be cleaned;

making the laser cleaning head emit a laser to moveably clean the first end surface at a predetermined first moving speed, till the first end surface is completely cleaned;

locating the laser cleaning head directly above a center line of the shaft component that is close to the first end surface, rotating the shaft component that is to be cleaned at an angular velocity; and moving the laser cleaning head at a second moving speed along an X-axis direction, so as to moveably clean a side surface of the shaft component that is to be cleaned;

moving the laser cleaning head to a transition region between sections of the shaft component that have different radiuses and rotating the laser cleaning head by 30 to 60 degrees to enable the laser cleaning head to be perpendicular to a surface of the transition region; stopping movement of the laser cleaning head; and then making the laser cleaning head continuously emit the laser to perform laser cleaning on the transition region of the shaft component till the transition region is completely cleaned;

rotating the laser cleaning head again to a position directly above a cleaning region of a next section of the shaft component that is to be cleaned, and performing the rotating the shaft component that is to be cleaned at the angular velocity, and performing the moving the laser cleaning head at the second moving speed along the X-axis direction, to clean the next section of the shaft component that is to be cleaned; and rotating the laser cleaning head to a second end surface of the shaft component that is to be cleaned, and moving the laser cleaning head of the laser cleaning equipment to be perpendicular to the second end surface of the shaft component that is to be cleaned; and making the laser cleaning head emit the laser to moveably clean the second end surface at the predetermined first moving speed, till the second end surface is completely cleaned.

2. The shaft component cleaning method according to claim 1, wherein a width of a linear laser spot emitted by the laser cleaning head is greater than or equal to diameters of both the first end surface and the second end surface.

3. The shaft component cleaning method according to claim 2, wherein the second moving speed of the laser cleaning head is less than or equal to $Lw/2\pi$, wherein L represents the width of the linear laser spot; and w represents the angular velocity.

* * * * *